Nov. 10, 1970   C. P. FROMMELT ET AL   3,538,655
LOADING DOCK SHELTERS

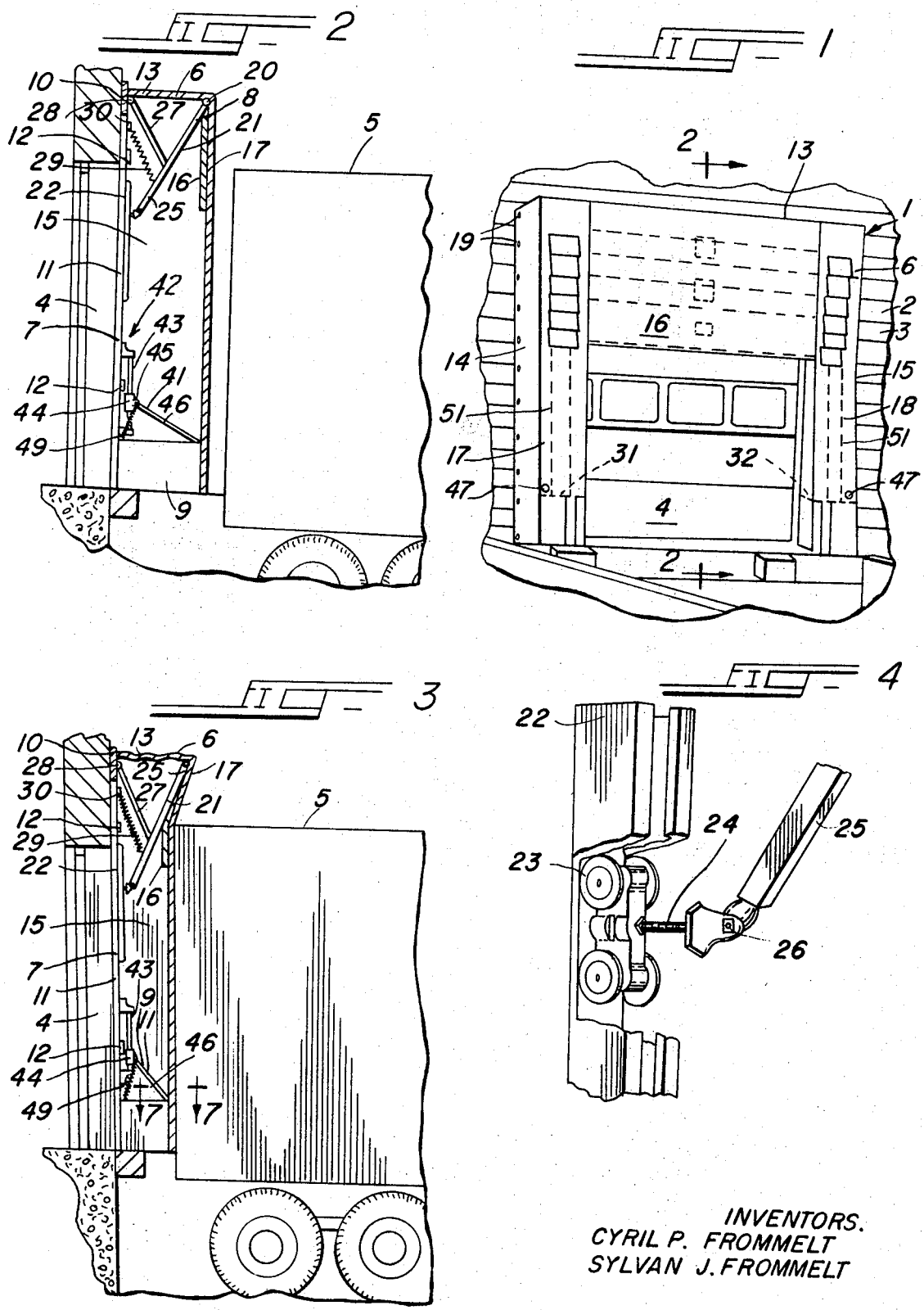

Filed April 11, 1968   2 Sheets-Sheet 2

INVENTORS.
CYRIL P. FROMMELT
SYLVAN J. FROMMELT
BY Marzall, Johnston, Cook & Root
ATTYS.

# United States Patent Office 3,538,655
Patented Nov. 10, 1970

3,538,655
LOADING DOCK SHELTERS
Cyril P. Frommelt and Sylvan J. Frommelt, Dubuque, Iowa, assignors to Dubuque Awning & Tent Company, Dubuque, Iowa, a corporation of Iowa
Filed Apr. 11, 1968, Ser. No. 720,582
Int. Cl. E04f *10/04*
U.S. Cl. 52—173        6 Claims

ABSTRACT OF THE DISCLOSURE

A loading dock shelter having a cover, the lower end of which is partially supported by resilient pads and partially supported by other yieldable members.

BACKGROUND OF THE INVENTION

This invention relates to loading dock shelters and, more particularly, to such shelters that are particularly well adapted for use as truck dock shelters.

It is a primary object of the present invention to afford a novel loading dock shelter.

Another object of the present invention is to enable a novel loading dock shelter to be afforded which embodies resilient pads and auxiliary supporting members for supporting the lower end portions of the shelters in a novel and expeditious manner.

Loading dock shelters of the retractable type, such as, for example, loading dock shelters of the type shown in our United States Letters Patent No. 2,892,463 have been heretofore known in the art. Also, loading dock shelters of the type embodying resilient pad members against which trucks, and the like, to be loaded and unloaded may be backed, such as, for example, loading dock shelters of the type shown in our United States Letters Patent No. 3,181,205 also have been heretofore known in the art. In addition, loading dock shelters embodying resilient pads for supporting the lower end portions of the covers thereof, and spaced from supporting units for the upper end portions of the covers, such as, for example, loading dock shelters of the type shown in our United States Letters Patent No. 3,352,314 have been heretofore known in the art. Such loading dock shelters have been highly successful and afford effective shelter for man and material during the loading and unloading of a truck, or the like, through a warehouse doorway equipped with such a shelter. These shelters, heretofore known in the art, afford effective, automatic sealing engagement between the shelters and a truck operatively engaged therewith.

It is an object of the present invention to enable the automatic sealing engagement between loading dock shelters and a truck operatively engaged therewith to be improved in a novel and expeditious manner.

Another object of the present invention is to afford loading dock shelters of the aforementioned type which can be quickly and easily mounted on and removed from a warehouse wall, or the like.

Yet another object is to afford a novel loading dock shelter which embodies a cover member for engaging a truck with a drape-type engagement, wherein the parts thereof are so constituted and arranged as to insure, in a novel and expeditious manner, an effective drape-type sealing engagement of the cover member with such a truck.

Another object is to overcome, in a novel and expeditious manner, problems heretofore encountered in the art in affording effective sealing engagement between a loading dock shelter and a truck, when the truck has projections thereon which tend to hold the loading dock shelter out of such effective sealing engagement.

A further object of the present invention is to afford a novel loading dock shelter of the aforementioned type which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a front perspective view of a loading dock shelter embodying the principles of the preesnt invention, with the shelter shown mounted in operative position around the doorway of a warehouse;

FIG. 2 is a longitudinal sectional view taken substantially along the line 2—2 in FIG. 1;

FIG. 3 is a view similar to FIG. 2, but showing certain parts disposed in different operative positions;

FIG. 4 is a fragmentary perspective view of a portion of the upper extension mechanism shown in FIG. 2;

DESCRIPTION OF THE EMBODIMENT SHOWN HEREIN

Figure 7:
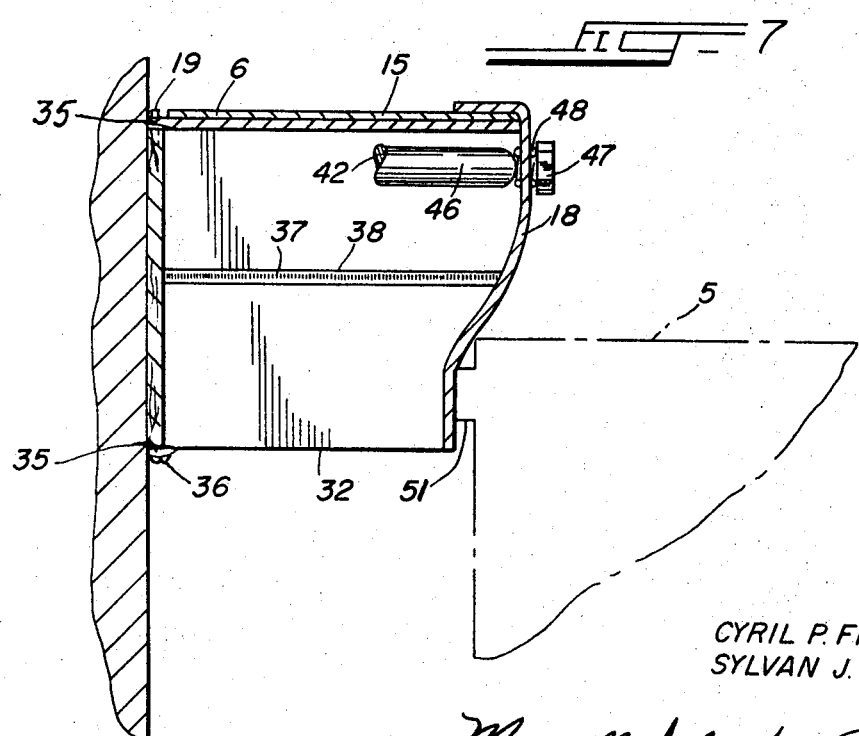
FIG. 7 is an enlarged detail sectional view taken substantially along the line 7—7 in FIG. 3.

A loading dock shelter 1 embodying the principles of the present invention is shown in the drawings to illustrate the presently preferred embodiment of the present invention. It is shown mounted on the outer wall 2 of a warehouse 3 in surrounding relation to a doorway 4 in the warehouse wall 2, FIG. 1. As will be discussed in greater detail presently, it is operable to afford an effective shelter between a truck 5 and the doorway 4, when, as shown in FIGS. 3 and 7, the truck 5 is disposed in normal operative position relative to the doorway 4 for loading and unloading operations to be effected through the doorway 4 and the rear end of the truck 5.

The loading dock shelter 1 embodies, in general, a cover 6 supported from a supporting frame 7 by an upper supporting unit 8 and a lower supporting unit 9, which supporting units are preferably vertically spaced from each other. In operation, the shelter 1 is mounted on the warehouse 3 in such position that the cover 6 projects outwardly from the wall 2 in position to be operatively engaged by a truck, such as the truck 5, as will be discussed in greater detail presently.

The supporting frame 7 may be made of any suitable material, such as, for example, wood, and embodies a substantially horizontally extending top rail or cross bar 10 extending between two substantially vertically extending side rails 11 disposed on opposite sides of the doorway 4, only one of the side rails 11 being shown in the drawings. The side rails 11 are secured at their upper ends to respective opposite ends of the cross bar 10 and project downwardly therefrom closely adjacent respective outer edges of the doorway 4. In operation, the frame 7 is secured to the outer face of the warehouse wall 2 by suitable means such as bolts 12, FIGS. 2 and 3, in such position that the cross bar 10 extends across the doorway 4 in upwardly spaced relation thereto.

The cover 6, which is mounted on the supporting frame in position to be extended outwardly therefrom, embodies an elongated top wall 13, two elongated side walls 14 and 15 extending downwardly from respective opposite ends of the top wall 13, a head curtain 16 depending from the top wall 13, and two elongated side curtains or front panels 17 and 18 extending inwardly toward each other from the side walls 14 and 15, respectively. The side curtains 17 and 18 are disposed in outwardly overlying relation to the head curtains 16. The walls 13–15 and the curtains 16–18 may be made of any suitable material, but preferably they are made from a water repellant, wear resistant material, such as, for example, canvas duck or rubber-impregnated nylon fabric.

It will be observed that the cover 6 is of a type which may be termed a "drape-type." That is, it embodies walls and curtains which consist of fabric or sheet material supported in more or less a tent-like manner as distinguished from fabric or sheet material affording the casing of a pad or pillow, or the like. The supporting frame 7 is disposed at the rear of the loading dock shelter 1, and the rear longitudinal edges of the walls 13–15 of the cover 6 are secured to the outer periphery of the frame 7 by suitable means such as nails or screws 19, FIGS. 1 and 7. The side walls 14 and 15 are secured along their upper ends to their respective opposite ends of the top wall 13 by suitable means, such as sewing, and the curtains 16–18 are similarly secured along their upper edges to the front longitudinal edge of the top wall 13. The side curtains or front panels 17 and 18 are similarly secured along their outer longitudinal edges to the front longitudinal edges of the side walls 14 and 15, respectively, the latter walls defining the respective opposite horizontal edges of the truck shelter 1.

The upper supporting unit 8 of the preferred form of loading dock shelter 1 shown in the drawings is of the type disclosed in our United States Letters Patents Nos. 2,892,463 and 3,352,314. It embodies an elongated frame member 20, FIGS. 2 and 3, disposed within the cover 6 and secured thereto along the junction of the top wall 13 with the head curtain 16. The frame member 20 preferably extends the full length of the top wall 13, and is supported at its opposite ends by suitable retractable, automatically-extending, supporting mechanisms 21 disposed at respective opposite sides of the doorway 4. The supporting mechanisms 21 are identical in construction and operation, and only one such mechanism is shown in the drawings, FIGS. 2 and 3, that being sufficient for an understanding thereof by those skilled in the art.

The supporting mechanism 21 mounted at the right side of the doorway 4, as viewed in FIG. 1, includes an elongated channel member or track 22, FIGS. 2, 3 and 4, secured to the front face of the side rail 11 of the supporting frame 7 in longitudinally extending relation thereto. A carriage 23, FIG. 4, is mounted in the channel member 22 for reciprocation longitudinally thereof, and includes an arm or bar 24 projecting forwardly from the channel member 22. The lower end of another arm or bar 25 is pivotally secured to the front end of the arm 24 by suitable means such as a pin or bolt 26, FIG. 4. The upper end of the arm 25 is secured to the frame member 20, FIGS. 2 and 3. The lower end of another arm or bar 27 is pivotally secured to the arm 25, intermediate the ends of the latter, and the upper end of the arm 27 is pivotally secured to an arm or bar in the form of a bracket 28, stationarily secured to the upper end portion of the side rail 11 and projecting forwardly therefrom. It will be understood that the upper supporting mechanism at the other side of the doorway 4 is similarly mounted on the side rail of the supporting frame 7 disposed at that side of the doorway 4.

As will be appreciated by those skilled in the art, each of the mechanisms 21 comprise lever mechanisms which embody a toggle joint afforded by the arms 25 and 27, and another toggle joint afforded by the arms 24 and 25. A tension coil spring 29 has its upper end connected to the supporting frame 7 by suitable means such as a bracket 30 secured to the side rail 11, and has its lower end secured to the supporting mechanism 21 in position to continuously urge the carriage 23 upwardly in the channel member 22 and thereby continuously afford an expanding force on the toggle joint afforded by the members 24 and 25 and on the toggle joint afforded by the members 25 and 27. The expanding force thus supplied to each of the toggle joints is effective to cause each of them to urge the frame 20 and the cover 6 outwardly away from the supporting frame 7.

It will be seen that with this construction, the upper supporting unit 8 not only affords an effective support for the cover 6, but also applies a strong, but yieldable, extending force to the upper portion thereof to thereby continuously urge the cover 6 toward fully extended position and, even when the cover 6 is in fully extended position, to continue to exert an extending force on it.

The lower supporting unit 9 embodies two resilient cushions 31 and 32 mounted on the rails 11 of the supporting frame 7, disposed at the left and right sides, respectively, of the doorway 4, as viewed in FIG. 1. The cushions 31 and 32 are disposed adjacent the lower end of the cover 6, and afford resilient members against which a truck, such as the truck 5, may back when it is being maneuvered into position to be loaded or unloaded through the warehouse door 4, as will be discussed in greater detail presently. In the preferred form of the invention, each of the cushions 31 and 32 embodies a substantially rectangular-shaped resilient pad 33 closely covered by a complementary, wear resistant casing 34, FIG. 5. The pad 33 may be made of any suitable material, such as, for example, any suitable natural or synthetic, compressible, resilient resin or polymer, our preferred material being a foamed polyether. Similarly, the casing 34 may be made of any suitable material, but preferably is made of a flexible, water-repellant, wear-resistant material, such as, for example, the aforementioned canvas duck or rubber-impregnated nylon fabric.

Figure 5:
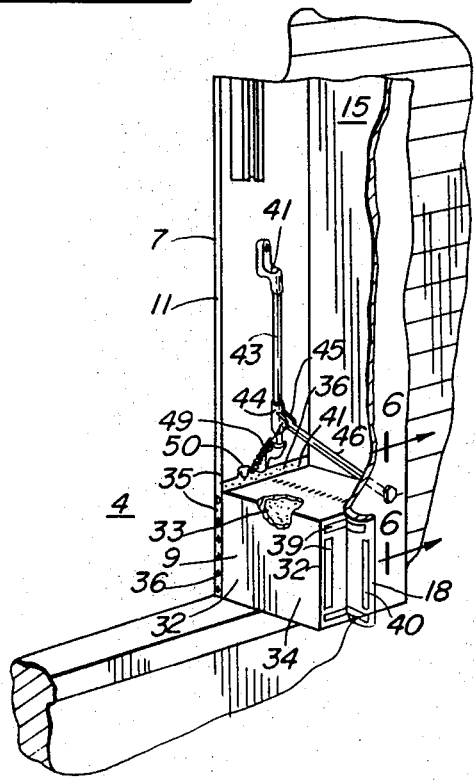
FIG. 5 is a fragmentary perspective view of a portion of the lower extension mechanism shown in FIG. 2.

Each of the casings 34 embodies flaps 35 projecting from each of the sides of one end thereof, and the resilient members 31 and 32 are secured to the side rails 11 disposed at the left and right, respectively, of the doorway 4, as viewed in FIG. 1, by suitable fastening members such as the aforementioned screws 19, FIGS. 1 and 5, and screws 36, FIGS. 5 and 7, extending through the flaps 35 into the respective side rails 11. Preferably, each of the casings 34 has an opening 37 in one side thereof through which the pad 33 may be inserted into and removed from the casing 34 so that the pads 33 are readily replaceable. Also, the opening 37 preferably is normally held in closed position by suitable releasable means, such as, for example, a zipper 38.

The resilient members 31 and 32 are secured to the respective side rails 11 of the frame 7 in directly rearwardly disposed relation to the lower end portions of the side curtains or front panels 17 and 18, respectively. They extend longitudinally outwardly from the frame 7 in a substantially horizontal direction, and, when the loading dock shelter 1 is in fully extended position, as shown in FIG. 2, the free ends of the resilient members 31 and 32 are preferably disposed in engagement with the rear faces of the substantially vertically disposed side curtains 17 and 18, respectively. Also, preferably, the lower end portions of the side curtains 17 and 18 are releasably secured to the resilient members 31 and 32 so as to hold the lower end portion of the cover 6 against flapping in the wind, and the like. However, as will be appreciated by those skilled in the art, such construction merely constitutes the preferred embodiment of the present invention and our invention is not limited thereto.

In the preferred form of loading dock shelter shown in the drawings, a plurality of securing members or fastening members 39, in the form of elongated, substantially rectangular-shaped strips, are mounted on and secured to the outer face of the free end of each of the casings 34 in closely adjacent, spaced relation to respective marginal edges thereof, FIG. 5. A plurality of other fastening members 40, which are similar in size and shape to the fastening members 39, are mounted on the inner face of the lower end portion of each of the side curtains 17 and 18, as illustrated with respect to the side curtains 18 in FIG. 5. The fastening members 40 are disposed in such position on the side curtains 17 and 18 that each of them is disposed in horizontally-forwardly, parallel, juxtaposition to a respective one of the fastening members 39 when the side curtains 17 and 18 are disposed in the aforementioned, normal operative position, FIGS. 1 and 2. The fastening members 39 and 40 are of the type which, when they are pressed into engagement with each other, firmly but releasably adhere to each other to afford a strong connection for holding the cushions 31 and 32 and the lower end portions of the side curtains 17 and 18, respectively, together, but with the connection being one which may be readily torn apart manually when it is desired to release the cover from the cushions 31 and 32.

The members 39 and 40 preferably are strips of fastening materials of the type readily available on the market under the trademark "Velcro," wherein the face of one of the complementary strips 39 or 40, which faces toward the other complementary strip 40 or 39, respectively, constitutes a brushed, suitable material such as nylon, or the like, to present a fuzzy face, and the other of the respective complementary strips 39 or 40 has a face embodying a plurality of small hooks formed from nylon, or the like, with the hooks operable to releasably engage in, and thereby adhere to the fuzzy face of the respective complementary strips. However, the fastening members 39 and 40 may be of other suitable material, such as, for example, suitable pressure-sensitive material, commonly available on the market, which may be repeatedly adhered to and released from each other.

The loading dock shelter 1, as thus far described herein, is substantially the same in construction as the loading dock shelter shown in our aforementioned earlier United States Letters Patent No. 3,352,314. Such a construction affords a highly effective loading dock shelter. One of the objects of the present invention is to afford improvements over such construction, particularly, in the manner in which the sealing engagement is effected between the lower end portion of a loading dock shelter and a truck backed thereagainst in normal operative relation thereto. It has been found that, with loading dock shelters constructed in the manner disclosed in the aforementioned United States Letters Patent 3,352,314, although effective and automatic sealing is effected between the lower end portion of the loading dock shelter and a truck backed thereagainst under normal circumstances, in certain abnormal circumstances there is a tendency for a somewhat inefficient seal to be effected between such a truck and the lower end portion of the loading dock shelter. For example, it has been found that with a loading dock shelter constructed in the manner shown in United States Letters Patent 3,352,314, when a truck, with certain types of projections extending from the bed or body thereof backs into the loading dock shelter with the projections in position to engage the pads at the lower end portion of the loading dock shelter, the pads tend to yield with the projection across the entire front face thereof, so that an effective drape-type engagement around the bed or body of the truck may not always be afforded. With a loading dock shelter constructed in accordance with the principles of the present invention this difficulty is overcome.

In the preferred embodiment of the present invention the lower supporting unit 9 embodies a supplemental supporting unit 41 for the lower end portion of the cover 6. The supplemental supporting unit 41 of the preferred form of loading dock shelter 1 shown in the drawings is of the type disclosed in our United States Letters Patent 2,892,463. It embodies two supplemental supporting mechanisms 42 disposed at respective opposite sides of the doorway 4. The supplemental supporting mechanisms 42 are identical in construction and operation, and only one such mechanism is shown in the drawings, FIGS. 2, 3 and 5, that being sufficient for an understanding thereof by those skilled in the art.

The supplemental supporting mechanism 42 mounted at the right side of the doorway 4, as viewed in FIG. 1, includes an elongated slide rod 43, FIGS. 2, 3 and 5, secured to the front face of the side rail 11 of the supporting frame 9 in longitudinally extending relation thereto. A slide 44 is mounted on the slide rod 43 for reciprocation longitudinally thereof, and includes an arm or bar 45 projecting forwardly from the slide rod 43. The upper end of another arm or bar 46 is pivotally secured to the front end of the arm 45, and the lower end of the arm 46 is releasably secured to the side curtain or front panel 18 by a bolt 47 extending through a grommet 48 in the side curtain 18 and threaded into the lower end of the arm 46, FIGS. 6 and 7. It will be understood that the lower supplemental supporting mechanism at the other side of the doorway 4 is similarly mounted on the side curtain 17 and the side rail 11 of the supporting frame 7 disposed at that side of the doorway 4.

As will be appreciated by those skilled in the art, the mechanisms 42 comprise lever mechanisms, each of which embodies a toggle joint afforded by the arms 45 and 46. A tension coil spring 49 has its lower end connected to the side rail 11 by suitable means such as a bracket 50, and has its upper end secured to the supporting mechanism 42 in position to continuously urge the slide 44 thereof downwardly along the slide rod 43 and thereby continuously afford an expanding force on the toggle joint afforded by the members 45 and 46. The expanding force thus applied to these toggle joints of the supplemental supporting mechanisms 42 is effective to cause each of them to urge the lower end portion of the cover 6 outwardly away from the supporting frame 9.

Figure 6:
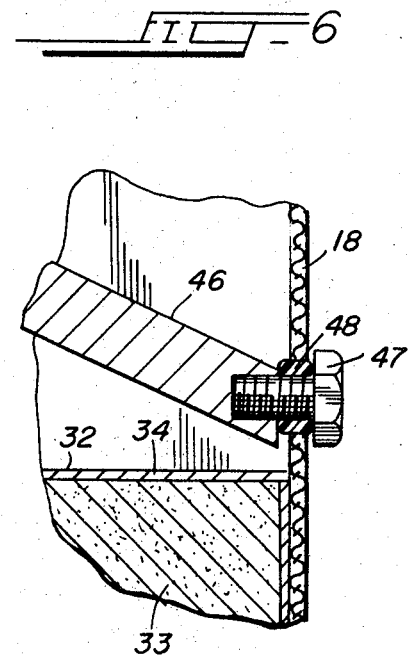
FIG. 6 is an enlarged, detail sectional view taken substantially along the line 6—6 in FIG. 5.

The arms 46 of the supplemental supporting mechanisms 42 are secured to the respective side curtains 17 and 18 by the bolts 47 in closely adjacent relation to the junction of the side curtains 17 and 18 with the side walls 14 and 15 of the cover member 6, FIGS. 1 and 7, and in closely adjacent, overlying relation to the cushions 31 and 32, as illustrated in FIG. 6 with respect to the cushion 32.

The cushions 31 and 32 in the preferred form of the present invention shown in the drawings preferably extend upwardly from the lower edge of the cover 6, and, therefore, upwardly from the bottom of the doorway 4, a distance of from twenty-four to thirty inches, so as to insure that they extend a minimum of twelve inches above the top of the highest bed of a truck to be disposed in operative position relative to the loading dock shelter 1. It will be seen that with this construction, it is insured that the supplemental supporting mechanisms 42 are disposed at a height above that at which they may be engaged by the bed of a truck backing against the loading dock shelter 1.

Vertically extending guide stripes 51 are preferably afforded on the front faces of the side curtains or front panels 17 and 18, FIG. 1, with the stripes extending along the longitudinal centers thereof. The supplemental supporting mechanisms 42 are preferably secured to the side curtains 17 and 18 outwardly of the respective guide stripes 51 thereon. Also, in the preferred construction of the loading dock shelter 1, the width thereof between the guide stripes 51 is such that the beds and bodies of the widest trucks using the dock shelter 1 do not extend outwardly beyond the longitudinal center lines of the guide stripes 51, when the trucks are properly positioned relative to the dock shelter 1; and the beds and bodies of the narrowest trucks using the dock shelters 1 are not disposed inwardly of the inner edges of the guide stripes 51 when the trucks are properly positioned relative to the dock shelter 1. It will be seen, that with this construction, the supporting mechanisms 42 are disposed outwardly of the normal position of trucks using the dock shelter 1 so as not to be engaged thereby. Also, it will be seen that with this construction, the supplemental supporting mechanisms 42 are disposed substantial distances outwardly of the inner longitudinal edges of the side curtains 17 and 18 so that they are protected against being struck by men, supplies or equipment moving through the warehouse door 4 into or out of a truck, such as the truck 5.

It has been found that with a loading dock shelter constructed in the manner of the loading dock shelter 1 shown in the accompanying drawings, the drape-type engagement between the lower end portion of the cover 6 and a truck, such as the truck 5, disposed in normal operating engagement therewith is enhanced. This is effected because the supplemental supporting mechanisms 42, engaged with the side curtains or front panels 17 and 18 outwardly of the truck afford a resistance to inward movement of the outer edge portions of the cushions 31 and 32, adjacent the side walls 14, and 15, respectively, which is supplementary to the natural resilience of the cushions 31 and 32. As a result, when a truck backs into a loading dock shelter 1 in normal position relative thereto, it compresses the inner edge portions of the cushions 31 and 32 relatively easily, while the outer edge portions thereof, because of the supplemental force afforded by the supporting mechanisms 42 are not compressed to the same extent. This affords a drape-type engagement between the cover 6 and the truck, with the outer edge portions of the side curtains 17 and 18 curling forwardly around the rear outer sides of the truck, as illustrated in FIG. 7 with respect to the side curtain 18, to thereby assist in insuring a weather-tight type of sealing engagement between the truck and the lower end portion of the cover 6.

Although, as will be appreciated from the foregoing, the aforementioned enhanced drape-type engagement is afforded even with trucks having smooth beds and bodies, this enhancement is of particular importance with trucks having projections such as, for example, the projection 51 on the rear of the truck 5 shown in FIG. 7. It will be seen that with such a projection on a truck, when the projection 51 engages a pad, such as the pad 32, it tends to press the entire face of the cushion 32 rearwardly, as is shown with respect to the inner edge portion of the front face of the pad 32. If this occurs, it may result in the cover portion, such as the side curtain 18 imperfectly contacting the body or bed of the truck 5 so as to afford an air gap between the truck 5 and the cover 6 around the projection 51. However, with the supplemental supporting mechanism 42 holding the outer edge portion of the pads, such as the pad 32, outwardly against inward movement, the engagement of a projection, such as the projection 51, with the pad 32 is ineffective to move the outer edge portion of the front face thereof inwardly so that the cover 6 is draped around the rear outer edge of the truck body in good sealing engagement therewith as is somewhat diagrammatically illustrated in FIG. 7.

From the foregoing it will be seen that the present invention affords a novel loading dock shelter embodying a novel lower supporting unit therefor, with the parts thereof constituted and arranged in a novel and expeditious manner.

In addition, it will be seen that the present invention affords a novel, yieldable, supporting structure for the lower portion of a drape-type loading dock shelter cover.

Also, it will be seen that the present invention affords a novel loading dock shelter which is practical and efficient in operation and which may be readily and economically produced commercially.

Thus, while we have illustrated and described the preferred embodiment of our invention, it is to be understood that this is capable of variation and modification, and we therefore do not wish to be limited to the precise details set forth.

We claim:

1. A loading dock shelter for protecting a doorway in a warehouse, or the like, and comprising:
    (a) a drape-type cover adapted to be connected to such a warehouse along the tops and sides of such a doorway,
    (b) means connected to the upper portion of said cover and adapted to be connected to such a warehouse for holding said upper portion of said cover in outwardly extended position relative to said warehouse,
    (c) resilient pad means adapted to be connected to such a warehouse between said warehouse and the lower portion of said cover for yieldingly holding said lower portion of said cover in outwardly extended position relative to said warehouse, and
    (d) lever means disposed between said first mentioned means and said pad means,
    (e) said lever means comprising rigid lever arms connected to said lower portion of said cover and adapted to be pivotally connected to such a warehouse for yieldingly holding said lower portion of said cover and upper portions of said pad means outwardly in extended position relative to said warehouse.

2. A loading dock shelter as defined in claim 1, and in which:
    (a) said cover has:
        (1) two horizontally spaced outer edges, and
        (2) front panels projecting inwardly toward each other from respective ones of said outer edges,
    (b) said pad means are disposed between said panels and such a warehouse when said cover and pad means are so connected to said warehouse, and
    (c) said lever means are connected to said panels in closely adjacent relation to said pad means.

3. A loading dock shelter as defined in claim 1, and in which:
    (a) said cover has:
        (1) two upstanding front panels, each having
            (a') upstanding inner and outer edge portions, and
        (2) two upstanding horizontally spaced outer edges,
    (b) said panels are so disposed that:
        (1) said outer edge portions thereof are disposed at respective ones of said outer edges of said cover, and
        (2) said inner edge portions project inwardly toward each other from said outer edges,
    (c) said pad means extend across said panels between said inner and outer edge portions thereof, and
    (d) said lever means are connected to said outer edge portions of said panels.

4. A loading dock shelter as defined in claim 3, and in which:
    (a) said upper portions of said pad means are disposed between such a warehouse and respective ones of said outer edge portions of said panels when said cover and said pad means are so connected to said warehouse.

5. A loading dock shelter as defined in claim 4, and in which:
    (a) said lever means are connected to said panels above, and adjacent to, said pad means.

6. A loading dock shelter for protecting a doorway in a warehouse, or the like, and comprising:
    (a) a drape-type cover adapted to be connected to such a warehouse along the tops and sides of such a doorway, (b) means connected to the upper portion of said cover and adapted to be connected to such a warehouse for holding said upper portion of said cover in extended position relative to said warehouse, (c) resilient pad means adapted to be connected to such a warehouse between said warehouse and the lower portion of said cover for yieldingly holding said lower portion of said cover in extended position relative to said warehouse, and (d) lever means disposed between said first mentioned means and said pad means, (e) said lever means being connected to said lower portion of said cover and adapted to be connected to such a warehouse for yieldingly holding said lower portion of said cover and upper portions of said pad means in extended position relative to said warehouse, (f) said cover having:
   (1) two upstanding front panels, each having:
      (a') upstanding inner and outer edge portions, and
   (2) two upstanding horizontally spaced outer edges, (g) said panels being so disposed that:
   (1) said outer edge portions thereof are disposed at respective ones of said outer edges of said cover, and
   (2) said inner edge portions project inwardly toward each other from said outer edges.

(h) said pad means extending across said panels between said inner and outer edge portions thereof, and (i) said lever means being connected to said outer edge portions of said panels, (j) said upper portions of said pad means being disposed between such a warehouse and respective ones of said outer edge portions of said panels when said cover and said pad means are so connected to said warehouse, (k) said lever means comprising toggle joint means having:
   (1) outer ends connected to said panels, and
   (2) inner ends adapted to be connected to said warehouse, and (l) spring means connected to said toggle joint means and adapted to be connected to such a warehouse, when said lever means is so connected to said warehouse, for urging said toggle joint means to straighten and thereby urge said panels away from said warehouse.

References Cited
UNITED STATES PATENTS

| | | | |
|---|---|---|---|
| 2,892,463 | 6/1959 | Frommelt et al. | |
| 3,181,205 | 5/1965 | Frommelt et al. | 52—173 X |
| 3,230,675 | 1/1966 | Frommelt et al. | 52—204 |
| 3,352,314 | 11/1967 | Frommelt et al. | 135—5 |
| 3,375,625 | 4/1968 | Edkins et al. | 52—204 |
| 3,437,367 | 4/1969 | Blank | 267—139 |

PRICE C. FAW, Jr., Primary Examiner

U.S. Cl. X.R.

135—5